United States Patent [19]

Karabedian

[11] Patent Number: 4,626,455
[45] Date of Patent: Dec. 2, 1986

[54] COEXTRUDED MULTILAYER SHEET AND SLEEVE LABEL FOR BOTTLES

[75] Inventor: James A. Karabedian, Toledo, Ohio

[73] Assignee: Owens-Illinois, Inc., Toledo, Ohio

[21] Appl. No.: 691,250

[22] Filed: Jan. 14, 1985

[51] Int. Cl.[4] .................... B65D 23/08; B32B 27/08
[52] U.S. Cl. ......................................... 428/35; 428/36;
428/515; 428/517; 428/318.6; 428/319.3;
428/318.4; 428/913; 215/12 R
[58] Field of Search .................... 428/35, 36, 515, 516,
428/517, 318.6, 319.3, 319.7, 319.9, 318.4

[56] References Cited

U.S. PATENT DOCUMENTS

| 4,069,934 | 1/1978 | Karabedian | 428/35 |
| 4,111,349 | 9/1978 | Buckler et al. | 428/319.9 |
| 4,463,861 | 8/1984 | Tsubone et al. | 428/35 |

Primary Examiner—John E. Kittle
Assistant Examiner—Thomas C. Saitta
Attorney, Agent, or Firm—John R. Nelson

[57] ABSTRACT

A tough, heat shrunk, wrinkle-free coextruded multilayer sheet sleeve label for containers, the sleeve especially adapted for solvent sealing although it can be sealed by ultrasonic, hot air and heat sealing, the sheet being a tough skin layer/brittle polystyrene foam layer structure, the skin layer comprising a polyolefin, a block copolymer of butadiene and styrene as a compatibility agent, and polystyrene, the compatibility agent providing limited adhesion to preserve the toughness of the skin layer for the total label structure, and the polyolefin providing the skin layer with the desired shrinkage rate and limited shrinkage when the label is heat shrunk.

28 Claims, 5 Drawing Figures

COEXTRUDED MULTILAYER SHEET AND SLEEVE LABEL FOR BOTTLES

The present invention relates to a coextruded multilayer sheet adapted to form a sleeve label for containers, the label being tough and readily sealable on a high speed basis by solvent sealing as well as ultrasonic, hot air, and heat sealing. The invention more particularly relates to a coextruded multilayer sheet comprising a polystyrene foam layer for the inside of the sleeve next to the container and a solid skin layer, the foam and skin layers being coextruded wherein the skin layer is an extrudable blend of a polyolefin and polystyrene and a block copolymer of styrene and a block copolymer of styrene and butadiene that provides the skin and foam layers with the desired limited compatibility and adhesion at the interface of the foam and skin layers. The polyolefin in the blend provides the skin layer with a more readily controllable shrinkage rate to more precisely match the shrinkage rate of the foam layer, the polyolefin also providing a low shrinkage force in the skin layer so wrinkles are not formed on the underside of the foam layer.

Thus, the invention relates to a tough skin layer/brittle foam layer coextruded multilayer heat shrinkable plastic sheet sleeve label for a container such as a glass bottle. The sleeve label can be formed on the container, for instance, by wrapping or by telescopically pushing up a preformed tubular sleeve from underneath the container. The preferred embodiment of the coextruded multilayer label is especially adapted for application to the container by wrapping and solvent sealing the label on a container such as a glass soft drink or beer bottle.

BACKGROUND OF THE INVENTION

Laminated (coextrusion coated) sheets for sleeve labels for containers are disclosed in the prior art, for example, U.S. Pat. Nos. 3,979,000 and 4,069,934 of James Karabedian, U.S. Pat. No. 3,760,968 of Amberg et al, all of the above being assigned to Owens-Illinois, Inc. U.S. Pat. No. 4,463,861 of Tsubone et al also discloses a laminated (coextruded two-layer) sheet and a heat shrinkable sleeve label for wrapping containers. The laminated sheet sleeve label comprises a solid film comprising polystyrene containing more than 50% by weight of styrene residues and foamed film comprising polystyrene containing more than 50% by weight of styrene and optionally not more than 30% by weight of rubber.

The prior art coextruded multilayer sleeve labels having polystyrene-type layers do not have as much toughness as desired.

In addition, it has been very difficult to heat shrink a coextruded multiple skin layer/foam layer label having a polystyrene foam underside on containers, especially cold (not preheated) glass bottles without having undesirable cold wrinkles (wrinkling on the foam layer next to the bottle) and skin wrinkles (wrinkling on the top skin surface) particularily in areas of the bottle such as the neck and bottom where often the diameter is significantly less and the multilayer label structure must shrink more there than in the body area of the bottle.

OBJECTS OF THE INVENTION

It is an object of the present invention to provide a coextruded plastic multilayer sheet sleeve label for containers, the sleeve especially adapted for solvent sealing although it can be sealed by ultrasonic, hot air and heat sealing, the sheet comprising a tough skin layer/brittle polystyrene foam layer structure, the skin layer comprising a polyolefin, a block copolymer of butadiene and styrene as a compatibility agent and polystyrene, the compatibility agent providing limited adhesion to preserve the toughness of the skin layer for the total label structure, and the polyolefin providing the skin layer with the desired shrinkage rate and limited shrinkage when the label is heat shrunk on the container.

It is an object of the present invention to provide a tough, wrinkle free, heat shrunk coextruded multilayer plastic sleeve label that is preferably sealed by solvent sealing, the label comprising a brittle polystyrene foam layer that is next to the container and an outer tough skin layer comprising a blend of polyolefin, a block copolymer of styrene and butadiene as a compatibility agent, and polystyrene, the polyolefin providing the skin layer with a desirable shrinkage rate and shrinkage force to enable the heat shrunk label to be wrinkle free.

These and other objects of the present invention will become apparent from the specification that follows, the appended claims, and the drawings, in which:

Figure 4:
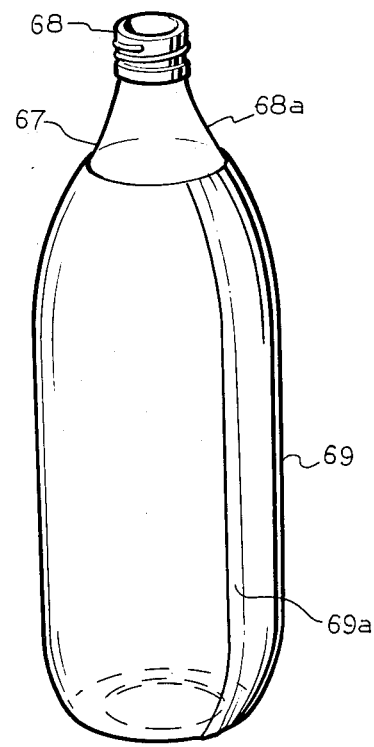
Figure 5:
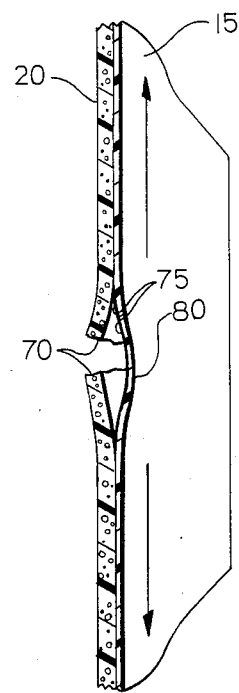

FIG. 4 is a perspective view of a glass container and a heat shrunk coextruded multilayer plastic label illustrating the wrinkle-free heat shrunk label in the neck area; and FIG. 5 is an enlarged, fragmentary perspective view, partly in section, of the coextruded multilayer label illustrating a small tear in the brittle foam layer, but the toughness of the total label structure being maintained intact, although the skin layer is elongated adjacent the tear.

THE INVENTION

The present invention provides a coextruded plastic multilayer sheet sleeve label for containers, the sleeve especially adapted for solvent sealing although it can be sealed by ultrasonic, hot air and heat sealing, the sheet comprising a tough skin layer/brittle polystyrene foam layer structure, the skin layer comprising a polyolefin, a block copolymer of butadiene and styrene as a compatibility agent and polystyrene, the compatibility agent providing limited adhesion to preserve the toughness of the skin layer for the total label structure, and the polyolefin providing the skin layer with the desired shrinkage rate and limited shrink force when the label is heat shrunk.

Describing the invention in more detail, there is provided a coextruded multilayer sheet adapted for use as a solvent seal label sleeve on containers, the sleeve also being sealable by ultrasonic, hot air and heat sealing, the sheet label comprising a foam polystyrene layer for use on the inside of the sleeve next to the container and an outer skin layer formed by extruding a blend of a polyolefin, polystyrene and a compatibility agent equivalent to that of a block copolymer of styrene and butadiene in which the amount of bound styrene is about 35 to 55 wt. % and the molecular weight (number average) is about 50,000 to 100,000, the polyolefin being used in an effective amount to provide the skin layer with a more readily controllable shrinkage rate that more precisely matches the shrinkage rate of the foam layer when external heat is applied to skin layer of the label to prevent undesirable wrinkles in the outer surface of the skin layer, the amount of polyolefin also being effective to provide a shrinkage force of the skin layer when its outer surface is heated that is not sufficient to form wrinkles on the underside of the foam.

Figure 1:
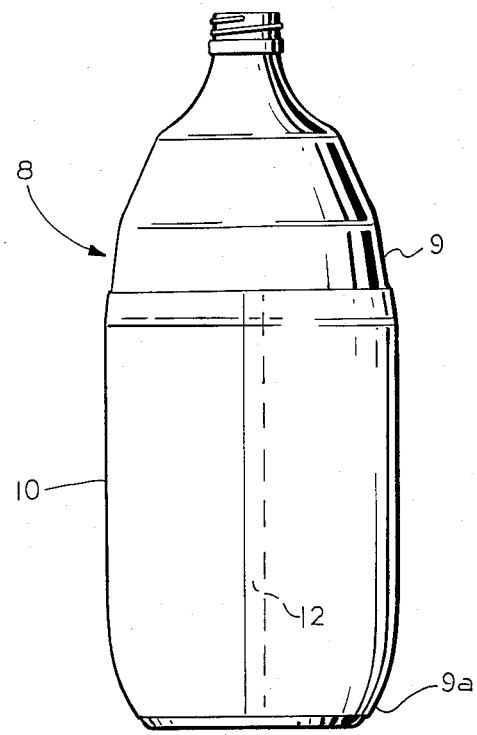
FIG. 1 is an elevational view of a glass container and a heat shrunk coextruded multilayer plastic sleeve label according to the present invention.

Turning to the drawings, in FIG. 1 there is shown a glass container having a body 9 and a smaller diameter bottom portion 9a with a coextruded multilayer heat shrunk sleeve label 10 on the container in a snug, wrinkle-free manner. A side seam seal 12 is provided, the seam seal 12 being sealable by solvent sealing, or by ultrasonic, hot air and heat sealing.

Figure 2:
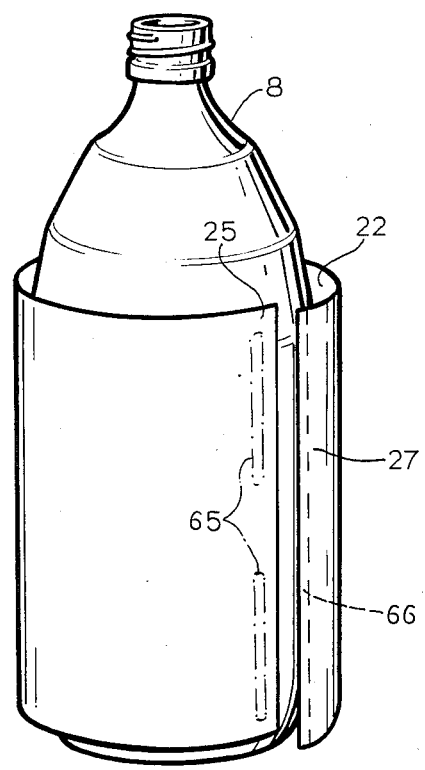
FIG. 2 is a perspective view of the container of FIG. 1 with a coextruded multilayer label partially wrapped around the container.

When the label 10 is wrapped around the container 8 as in solvent sealing when an active solvent such a methylene chloride is used with a polystyrene foam underside, the label 10 is shown partially wrapped around the container 8 in FIG. 2.

The coextruded label 10 has an outer tough skin polymer layer 15 and a brittle polystyrene foam layer 20 with an underside 22 next to the container, a leading edge portion 25 and a trailing edge portion 27. Finite areas 65 are provided near the leading edge and a finite area 66 is provided on the trailing edge. These finite areas are momentary, soldifying tacky solutions of the polymer (polystyrene) in methylene chloride (solvent) in the foam layer 20. The finite area on the trailing edge forms a tacky solution also, the bond formed becoming stronger and stronger as time goes by.

Solvent sealing is disclosed in copending U.S. application Ser. No. 555,786 filed 11/28/83 (Fumei), assigned to the same assignee as the present application. The application is hereby incorporated by reference.

In FIG. 4, a glass container 67 having a finish 68 and a thin neck 68a is shown. A wrinkle-free, tough, heat shrunk, coextruded multilayer sheet sleeve label 69 having a side seam seal 69a is shown on the container. The label is wrinkle-free even though the heat shrinking included shrinking over a smaller diameter container bottom portion and an even smaller diameter neck portion area 68a.

It is now recognized that the tough skin 15 and brittle foam 20 must not be too well bonded or the benefits of the toughness of the skin will be lost. As seen in the greatly enlarged cross section shown in FIG. 5, the shear bond strength of the skin and foam layers is less than the yield strength of the tough skin to maximize the toughness of the total label structure. When forces are applied to the laminate in the direction of the arrows shown in FIG. 5, the foam layer 20 tears slightly at 70 to pull away from the adjacent surface 75 of the skin. The skin resists tearing and stretches and necks down slightly at 80 but does not break until stretched beyond the elastic limit of the skin.

Figure 3:
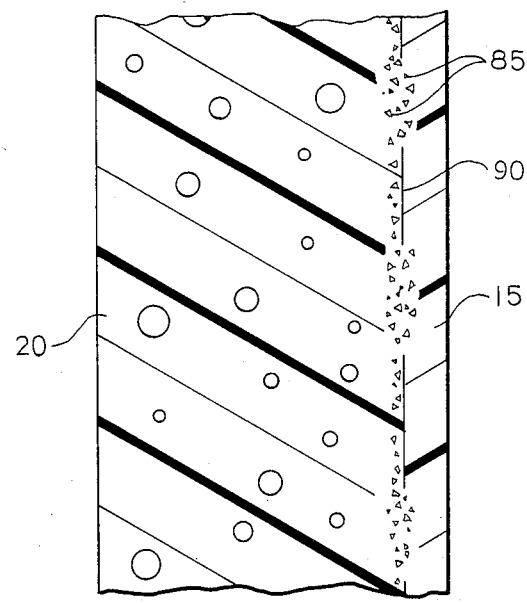
FIG. 3 is an enlarged fragmentary sectional view of the heat shrunk coextuded multilayer sheet sleeve label.

FIG. 3 shows a greatly enlarged fragmentary schematic view of the tough skin layer/brittle foam layer coextruded label structure. Although not wishing to be bound by theory, the suggested label structure shows a number of styrenic sites depicted by triangles 85 near and at the interface 90 of the skin and foam layers. The triangles 85 represent very small styrenic groups that are located randomly in the skin layer and generally predominately in the foam layer to form compatible bonding areas and sites along the interface 90, especially when solvent sealing is employed to make and seal the side seam. Apparently there is an intermingling of molecules of styrene in the skin and the foam. The more sites 85 that there are in the structure, the stronger the bond between the foam and the skin layers. Hence, to obtain the more desirable limited adhesion, the fewer the sites 85, the lower the bond strength.

Not only is there a problem of toughness that requires a certain amount of the block copolymer of styrene and butadiene as a compatibility in the skin layer for limited compatibility and adhesion at the skin/foam interface, but there is a problem of heat shrinking the coextruded multilayer sheet sleeve labels on containers such as shown in FIGS. 1 and 2 in which the label has to cover smaller diameter bottom and neck areas in a snug wrinkle-free manner.

With unheated (cold) bottles, cold wrinkles are very difficult and nearly impossible to eliminate with polystyrene foam and skin polystyrene sheet label. The use of polyethylene in the skin allows one to correct for cold wrinkle problems but tends to introduce skin wrinkles. Skin wrinkles, however, can be controlled as indicated herein by the polyolefin/block copolymer/polystyrene blends that make a near impossible situation possible.

There follows a description and comments on label shrink requirements in general with some specific problems solved by the present invention.

In practice, one requires a certain rather high percentage of machine direction shrinkage (around 60%) and little or no shrinkage in the cross direction (usually less than about 10%). The values cited reflects total shrinkage, i.e. the amount of shrinkage one would get if one heated the sample up to a temperature that approaches the extrusion melt temperature, bearing in mind that the shrink process in label application rarely reaches these temperature extremes.

With (amorphous) polystyrene, one can subject foam samples to heat and determine the amount of shrink with increasing temperatures. Customarily, shrinkage initiates at $t_g$ (softening point of the foam material) and gradually increases as the sample temperature is increased: For example; at 200° F. . . . 3.8%; 205° F. . . . 6%; 210° F. . . . 16%; 220° F. . . . 42%; 230° F. . . . 50%; 250° F. . . 65%.

Usually the demand for dimensional change is much less than the orientation (shrinkage) imposed to the label material. In practice, one does not or can't heat the sample up to the high levels cited and, if one could, the label would be so flimsy as to present handling problems. Also, as one approaches the higher levels of shrinkage, the shrinkage forces are significantly lower so that gravity and centrifugal forces tend to overcome the shrinkage forces.

So far, there has been discussed machine and cross direction orientation. In the manufacturing process one also induces a so-called "Z" direction orientation (the others being "X" and "Y"). This results from cooling the extrudate foam on both sides of the sheet. If skin (nonfoamed—more heat conductive) material is cooled under the same conditions as the opposite foamed side, the sheet will have more orientation on the skin side than the foam side. When a sample of this type is heated the material will not only shrink in the machine and cross direction but will curl towards the skin side since that surface is trying to shrink more than the opposite side.

In practice, a sample having the above properties will, when shrunk around a bottle, results in the label undesirably shrinking outward from the container at the upper and lower surface. Also, the shrink heat is being applied to the external surface whereas the backside of the label heating more slowly, the label will wind up looking puckered. Bear in mind that while heat is being applied to outer surface the back surface is losing heat to the container material. The more heat conductive the container material the greater is the problem in getting an aesthetically acceptable shrunken label; i.e. metal is worse than glass which is worse than plastic which in turn is worse than paper. A foamed plastic container is better than nonfoamed container.

The puckering or a cold wrinkle in the label is brought about by the fact that the skin side has more orientation than the opposite foamed surface and is attempting to shrink before the backside of the label has gotten hot enough to shrink. At some point during the heating cycle, the shrink forces in the skin and substrate just below the skin will become great enough to overcome the rigidity of the remaining unheated portion (backside) of the label. The collapsed substrate having once made an intimate contact with the container wall begins now to reach the container wall temperature. Inasmuch as most often the container wall is cooler than the required temperature for shrinkage, the resulting effect is, as mentioned, a shrunken label which is puckered or wrinkled. One often refers to this defect as a "cold" wrinkle.

On the opposite end of the spectrum is the condition where in the skin (outside or printed) side is wrinkled after shrinkage. There is a greater tendency for this "defect" to occur when the label is of a multilayer structure such as the coextruded sheet of the invention. This defect results in the mismatch of orientation between the skin and foam substrate. More specifically, when the label material is subjected to heat and shrinkage occurs, if the amount of shrinkage of the skin does not match (identically) the substrate, wrinkling will develop. In this instance the foam will shrink more than the skin causing the skin to pucker up, resulting in a wrinkled appearance.

As one should invision, this latter condition (which one refers to as "skin" wrinkles) is opposite from the situation which causes "cold" wrinkles. In one instance the skin has too much shrinkage causing "cold" wrinkles whereas in the other the skin does not have enough shrinkage causing "skin" wrinkles. In practice, the causes for the occurrence of these defects becomes more complicated, since in reality these shrinkages must be balanced (equal) with a temperature gradient through the sheet. Whether one uses IR (infrared) or hot air heat to shrink the labels, the outside surfaces of the label will always be hotter than the label surface next to the container. And, as has been mentioned, the heat shrink effect of the container contributes further to the cause and magnitude of this temperature gradient.

Since bottles (including glass and oriented plastic containers) come in different shapes requiring different percentages of shrink and since they may be wrapped on-line when they are warm, or off-line when warehoused, bottle temperatures can vary as much as 100° F., label performance requirements become more demanding. Certain glass/sleeve label machines had provision to preheat the bottles on which labels were to be shrunk. Now, however, with efforts to reduce investment and operating costs by using a roll-on label concept (solvent sealing, etc.) label performance requirements becomes even more demanding.

As known in the art, in manufacturing foam via a coextrusion process, machine direction, cross direction and "Z" (or through the sheet direction), orientation (shrinkage) is controlled by controlling a number of variables among which is line speed and external and internal cooling of the web.

The "Z" direction orientation is predominantly controlled by adjusting at some specified line speed the extent of internal versus external cooling. When one uses polystyrene (whether it be general purpose or rubber-modified impact polystyrene) as the skin polymer, one is limited to a very narrow operating range for controlling "Z" direction orientation. What happens is that external cooling tends to very quickly cool the nonfoamed skin causing it to become much more oriented than a foamed material. In addition, the polystyrene skin develops high shrink forces so that when reheated there is a tendency for "cold" wrinkles to develope. Even when one optimizes the manufacturing process so that skin and foam shrinkages are equal, the variable gradient effect with higher heat source against the skin side will cause the styrenic (polystyrene) skin to shrink with sufficient force to result in "cold" wrinkles particularly on containers or bottles (including glass) that have not been preheated.

In manufacturing, there is a continual testing of coextruded sheet with styrenic skin to make sure that the foam, when shrunk, will not shrink towards the skin side—otherwise even when glass bottles are preheated one will get labels that are "cold" wrinkled.

In the present invention, by adding compatibilized polyolefin (polyolefin/block copolymers) to the skin, the operating window is opened up considerably, as follows:

1. With medium and high concentrations (say 5 to 50 wt. %) of polyolefin in the skin, there is sufficient reduction in orientation shrink forces to minimize the tendency for the structure to curl towards the skin side . . . eliminating the tendency for "cold" wrinkles.

2. The higher level (say, 30 to 50 wt. %) of polyethylene increases the resistance of the label to chemical attack. Vegetable oil based compounds employed in industry non-toxic machinery lubricants have a deleterious effect on styrenic polymers especially when they are under tension.

3. The crystallinity of the polyolefins reduces the tendency for attaining the same percentages in orientations when treated under similar conditions to polystyrene. Under coextrusion manufacturing conditions one can cool the styrenic foam and polyolefinic/block copolymer skin blend simultaneously without being concerned that the skin material is being too highly oriented. The latter also (in addition to reduced shrink forces) contributes to lesser tendency for "cold" wrinkles.

4. The lower shrink forces and orientation of the skin permits one to apply higher heats to accelerate shrinkage than would be the case with a styrenic skin which is required for higher production speeds.

5. Roll stock labels to be shrunk have lower cross-direction orientations. At times (especially with plastic bottles such a oriented plastic carbonated beverage bottles) general purpose styrenic skins are borderline with splitting occurring parallel to the machine direction. Care must be taken at all times to properly balance cross direction orientation to prevent splitting, and yet not cause cross-direction curl. The addition of polyolefin in the skin blend eliminates this problem.

6. Should the need arise, the thickness of the tougher polyolefinic skin blend can be increased to aid cullet retention because it is a tougher skin structure than either general or impact grades of polystyrene.

7. If one is using the solvent seal process, the employment of higher levels of polyolefin significantly opens the window with regard to the resistance to seam splitting due to label misapplication technique or variability of foam substrate . . . particularly on plastic bottles such as oriented polyethylene terephthlate carbonated beverage bottles which expand after filling.

One of the advantages of polyethylene in the skin is that one can coextrude a sheet of label material adjusting cooling with much less concern with regards to curling towards the skin. This is a very important requirement in preventing "cold" wrinkles in general and imperative on non-preheated bottles.

Skin wrinkles, although not as much of a problem with styrenic (polystyrene) skins, can be eliminated by providing sufficient skin orientation in the polyolefin blend and reduced MD orientations for the foam substrate. If the demand rate for shrinkage is 20% (or 25 to 40%) then it is important to provide sufficient skin cooling so that skin will also shrink approximately 20% along with the substrate. This can be confirmed in the lab by testing for wrinkled appearance and amount of curl after the sample has been shrunk 20%. Severe skin wrinkling (or curl) indicates that the skin does not have sufficient orientation.

The block copolymer used herein is one of styrene and butadiene, for instance, prepared by anionic polymerization. The copolymers are thermoplastic rubbers, showing the behavior of vulcanized elastomers at room temperature, with hard chain length blocks of styrene acting similarily to crosslinks to prevent creep in the polybutadiene block matrix. At higher temperatures, they undergo normal plastic flow.

The butadiene component of the copolymer can be replaced by isoprene or ethylene butylene as, for instance, is available as KRATON TM rubber materials including 1102 and 1107 from Shell Chemical.

Stereon 840A and other Stereon TM elastomers, available from Firestone, Akron, Ohio, are preferred butadiene-styrene block copolymer elastomers, the preferred block copolymer containing about 35 to 55 wt. % bound styrene and having a number average molecular weight of about 50,000 to 100,000. Stereon 840A brochures list two of the block copolymers having 53 and 43 wt. % bound styrene and number average molecular weight about 60,000 to 80,000.

The compatibility agent that provides the proper amount of adhesion between the skin and foam layers is used in the skin layer to limit the adhesion and, hence, maximize the toughness of the total label structure. The compatibility agent is equivalent to that of a block copolymer of butadiene and styrene containing 35 to 55 wt. % bound styrene and a molecular weight of about 50,000 to 100,000.

Coextrusion of multilayer sheets is known in the art, as for instance, generally disclosed in U.S. Pat. No. 4,244,900 to James E. Heider. As is known, heat shrinkable multilayer sheets for heat shrunk sleeve labels can be made by coextrusion that comprises concurrently extruding a foamed film (for instance, a polystyrene foamed film) and a nonfoamed solid skin film (for instance, a polystyrene film). The foamed film side of the laminate is generally cooled more quickly than the skin film, the foamed side having more shrinkage than the skin side when later used as a heat shrunk sleeve label for containers.

The skin and foam layers are oriented and will shrink down on the container when heated, say about the softening point ($t_g$) of the foam material around, for instance, 180° or 200° up to 230° F. or 250° F. or more. The heat for shrinking the sleeve labels in high speed production operations is often infrared sources as is known in the art. Method and apparatus for applying heat shrunk plastic sleeve labels to containers are known in the art including a coextruded multilayer sleeve label that is a coextruded structure of a solid polymer skin layer and a foamed layer. The solid skin layer of the multilayered label can be about ¼ or ½ to 5 mils in thickness and the foam layer about 3 to 20 and preferably 4 to 12 mils.

Good results have been obtained with a total label structure of a 2 mil skin layer of 40 wt. % high density polyethylene, 40 wt. % of a block copolymer of styrene and butadiene having 43 wt. % bound styrene and a number average molecular weight of about 80,000 and 20 wt. % polystyrene, the skin layer being bonded to a coextruded polystyrene foam layer of about 5 mils. Good results also have been obtained with a label as above described with 40 wt. % high density polyethylene, 20 wt. % of the copolymer, and 40% polystyrene, as well as with a label having a skin layer of ½ mil of 10% polyethylene, 10% copolymer and 80 wt. % polystyrene, the foam layer being 10-½ mils.

The tough skin/brittle foam laminate is protected from degradation from heat, light and oxygen by antioxidants or other stabilizers including UV absorbers, hindered amine light stabilizers, antioxidants and nickel quenchers. Suitable stabilizers include UV stabilizers based on hydroxy phenyl benzotriazole including Tinuvin TM 328 (Ciba-Geigy); hindered amine light stabilizers including Tinuvin TM 292 (Ciba-Geigy); antioxidants including Iganox hindered phenolic compounds such as Iganox TM 1010, 1076 and B225 (Ciba-Geigy) that is a synergistic combination of an organophosphite and a hindered phenol; and a nickel phosphonate such as Irgastab TM 2002 (Ciba-Geigy).

In another embodiment, tough coextruded multilayer labels can be made for some applications by using polyethylene vinyl acetate and polyethylene ethylacrylate as the compatibility agent, the polymers generally having at least about 10 or 12 or 15 wt. % vinyl acetate, ethylacrylate or methylacrylate groups or residues to function as the compatibility agent. The polyethylene portion of the polyethylene vinyl acetate also serves as all or a portion of the polyolefin component. When the wt. % of vinyl acetate, ethylacrylate or methylacrylate groups is less than about 10 or 11%, the polyethylene ethylacrylate, polyethylene methylacrylate or polyethylene vinyl acetate can be used as all of the polyolefin component. Hence using polyvinylacetate or polyethylacrylate as all or part of the polyolefin and compatibility agent components can provide, in some instances, a tough label that can be heat shrunk on a container without cold wrinkles or skin wrinkles.

Exemplary of suitable copolymers of ethylene and vinyl acetate, or ethylacrylates, are those copolymers having a vinyl acetate or ethylacrylate content, or moiety, of less than about 40 weight percent and an ethylene content, or moiety, in excess of about 60 weight percent. Exemplary of these copolymers are the copolymers of ethylene and vinyl acetate commercially supplied by U.S.I. having vinyl acetate moieties ranging from about 18 to about 33 wt. %, ethylene moieties in an amount of about 67 to about 82 wt. % and melt indexes ranging from about 0.4 to about 125. Preferred compositions are those having vinyl acetate moieties in the range of about 28 to 31 weight percent with melt indexes in the range of about 1 to about 3. Exemplary copolymers of ethylene and an alkyl ester of an alphabeta monoethylenically unsaturated carboxylic acid are those wherein the carboylic acid moiety contains from 3 to 5 carbon atoms and wherein the alkyl moiety contains from 1 to 3 carbon atoms; for example, methyl, ethyl, and propyl esters of, for example, acrylic acid, methacrylic acid, and ethacrylic acid. Preferably these copolymers will have an ethylene content, or moiety, in excess of about 75 wt. % and the moiety of the alkyl ester of a monoethylenically unsaturated carboxylic acid will be less than about 25 wt. % and desirably these copolymers will have melt indexes of less than about 21 and preferably in the range of about 1 to 3. A particularly preferred copolymer is a copolymer of ethylene and ethylacrylate such as, for example, those commercially supplied by Union Carbide Corporation having ethylacrylate moieties in the range of about 1.7 to about 22.5 wt. % and ethylene moieties in the range of about 98.3% to about 77.5 wt. %, with melt indexes in the range of about 0.1 to 21. Particularly suitable ethylene copolymers are those having an ethylacrylate moiety of about 11 wt. % to about 22% and an ethylene content of about 89 to about 78 wt. %, with those having an ethylacrylate moiety of about 15 to about 18 wt. % and an ethylene moiety of about 82 to about 85 wt. % being especially suitable and which have melt indexes in the range of about 1 to about 3. Exemplary of the copolymers of ethylene and an alphabeta monoethylenically unsaturated carboxylic acid are the commercially available copolymers wherein the carboxylic acid moiety contains from 3 to 5 carbon atoms including, for example, acrylic acid, methacrylic acid, and ethacrylic acid. Further exemplary of these polymers are those having an ethylene moiety in excess of about 65% preferably in excess of about 80% and wherein the moiety of the alphabeta monethylenically unsaturated carboxylic acid is less than about 35 wt. % and preferably less than about 20 wt. %. Preferably these copolymers will have melt indexes in the range of about 1 to about 5.

The materials employed in the skin and foam layers are widely commercially available and those skilled in the art will routinely select the appropriate materials. With regard to polystyrene, it is generally preferred to employ that polystyrene which is referred to in the art as general purpose or impact styrene. Exemplary of these polystyrenes are those available from Dow Chemical Company under their designation 484 as well as those available from Cosden Chemical Company under their designation 550. Exemplary of the commercially available polystyrenes which will be found to be suitable are those having weight average molecular weights in excess of about 100,000, for example in the range of about 240,00 to 320,000, or those having melt flows in the range of about 1 to about 5 (ASTM test D12378-70 at ASTM Condition G). A particulary suitable polystyrene has a weight average molecular weight of about 280,000 and a melt flow of about 2.0.

The polyolefin component in the novel skin polymer blend can be polyethylene including high density polyethylene, which is preferred as well as low density polyethylene (density of about 0.910 to 0.925) including linear low density polyethylene or copolymers of ethylene with at least about 50 wt. % ethylene such as polyethylene ethylacrylate, polyethylene vinyl acetate, and polyethylene methylacrylate. The polyolefin can be polypropylene, polybutylene or copolymers thereof.

What is claimed is:

1. A coextruded multilayer sheet adapted for use as a solvent seal label sleeve on containers, the sleeve also being sealable by ultrasonic, hot air and heat sealing, the sheet label comprising a foam polystyrene layer for use on the inside of the sleeve next to the container and an outer skin layer formed by extruding a blend of a polyolefin, polystyrene and a compatibility agent, the compatibility agent being used in an effective amount to provide limited compatibility and limited adhesion between the skin layer and the foam layer at the interface, thereof, to enhance the toughness of the label, the amount of polyolefin being an effective amount to provide the skin layer with a shrinkage rate that matches the shrinkage rate of the foam layer when external heat is applied to skin layer of the label to prevent undesirable wrinkles in the outer surface of the skin layer, the amount of polyolefin also being effective to provide a shrinkage force of the skin layer when its outer surface is heated that is not sufficient to form wrinkles on the underside of the foam.

2. A sheet as defined in claim 1 in which the blend comprises about 5 to 50 wt. % of the polyolefin, about 15 to 25 wt. % of the polystyrene and about 5 to 50 wt. % of the compatibility agent.

3. A sheet as defined in claim 2 in which the polyolefin is high density polyolefin and the block copolymer compatibility agent contains about 38 to 53 wt. % bound sytrene.

4. A sheet as defined in claim 1 in which the blend comprises about 40 wt. % high density polyethylene, about 20 wt. % polystyrene and about 40 wt. % of a block copolymer of sytrene and butadiene containing about 43 wt. % bound styrene.

5. A sheet as defined in claim 3 in which the blend includes an antioxidant to prevent degradation of the block copolymer by exposure to heat and oxygen.

6. A sheet as defined in claim 1 in which about 5 to 50 wt. % of the blend is the polyolefin which provides the skin layer with a shrinkage rate such that the entire label shrinks down free of wrinkles and blemishes on the outer skin surface and the underside of the foam layer even when an end portion of the label must shrink at least about 20% more than the main body portion of the label to snugly wrap a container.

7. A sheet as defined in claim 1 in which the amount of polyolefin in the skin layer is about 20 to 40 wt. %.

8. A sheet as defined in claim 7 in which the polyolefin is high density polyethylene and the amount used is about 30 to 40 wt. %.

9. A sheet as defined in claim 8 in which the amount of polyethylene used is about 40 wt. %.

10. A coextruded multilayer sheet adapted to form a label sleeve for containers, a polystyrene foam layer adapted to be inside the sleeve adjacent a container and an outer skin layer adapted for printing or decorating comprising solid skin formed by extruding a blend of about 5 to 50% by wt. of a polyolefin; about 15 to 25 wt. % polystyrene and an effective amount of a compatibility agent to provide compatibility and a limited amount of adhesion at an interface between the skin and the foam layer sufficient to provide the label with toughness, sealability, and good seal strength, the compatibility agent comprising a block copolymer of styrene and butadiene, the polyolefin providing the skin layer with a shrinkage rate and limited shrinkage so the label can be heat shrunk on a container without wrinkles.

11. A sheet as defined in claim 10 in which the block copolymer is present in an amount of about 5 to 50% by wt.

12. A sheet as defined in claim 10 in which the sheet has ends that are overlapped to form a side seam, the side seam of the label being sealed by solvent sealing.

13. A coextruded multilayer sheet adapted for use as a solvent seal label sleeve on containers, the sleeve also being sealable by ultrasonic, hot air and heat sealing, the sheet label comprising a foam polystyrene layer for use on the inside of the sleeve next to the container and an outer skin layer formed by extruding a blend of a polymer that is a polyolefin having alkylene moieties with 2 to 4 carbon atoms, polystyrene and a compatibility agent having compatibility enhancing groups for the alkylene moieties, the compatibility agent being used in an effective amount to provide limited compatibility and limited adhesion between the skin layer and the foam layer at the interface, thereof, to enhance the toughness of the label, the amount of alkylene moieties being an effective amount to provide the skin layer with a shrinkage rate that matches the shrinkage rate of the foam layer when external heat is applied to skin layer of the label to prevent undesirable wrinkles in the outer surface of the skin layer, the amount of alkylene moieties also being effective to provide a shrinkage force of the skin layer when its outer surface is heated that is not sufficient to form wrinkles on the underside of the foam.

14. A sheet as defined in claim 13 in which the blend comprises polyolefin, polystyrene, and about 5 to 50 wt. % compatibility agent that is polyethylene ethylacrylate.

15. A sheet as defined in claim 13 comprising polyolefin, polystyrene and a compatibility agent that is polyethylene vinyl acetate.

16. A sheet as defined in claim 13 comprising polyolefin, polystyrene and a compatibility agent that is polyethylene ethylacrylate or polyethylene vinyl acetate.

17. A coextruded multilayer sheet adapted for use as a heat shrunk label sleeve on containers, the sheet label comprising a foam polystyrene layer for use on the inside of the sleeve next to the container and an outer skin layer formed by extruding a blend of a polyethylene having alkylene moieties with 2 carbon atoms, polystyrene and a compatibility agent having compatibility enhancing groups for the alkylene moieties, the compatibility agent being used in an effective amount to provide limited compatibility and limited adhesion between the skin layer and the foam layer at the interface, thereof, to enhance the toughness of the label, the amount of alkylene moieties being an effective amount to provide the skin layer with a shrinkage rate that matches the shrinkage rate of the foam layer when external heat is applied to skin layer of the label to prevent undesirable wrinkles in the outer surface of the skin layer, the amount of alkylene moieties also being effective to provide a shrinkage force of the skin layer when its outer surface is heated that is not sufficient to form wrinkles on the underside of the foam.

18. A sheet as defined in claim 17 in which the blend comprises polyethylene, polystyrene, and about 5 to 50 wt. % compatibility agent that is polyethylene ethylacrylate.

19. A sheet as defined in claim 17 comprising polyethylene, polystyrene and a compatibility agent that is polyethylene vinyl acetate.

20. A sheet as defined in claim 17 comprising polyethylene, polystyrene and a compatibility agent that is polyethylene ethylacrylate or polyethylene vinyl acetate, or polyethylene methylacrylate.

21. A sheet as defined in claim 13 in which the compatibility agent is polyethylene methylacrylate.

22. A coextruded multilayer sheet adapted for use as a solvent seal label sleeve on containers, the sleeve also being sealable by ultrasonic, hot air and heat sealing, the sheet label comprising a foam polystyrene layer for use on the inside of the sleeve next to the containers and an outer skin layer formed by extruding a blend of (1) a polymer having alkylene moieties with 2 to 4 carbon atoms and compatibility enhancing groups for the alkylene moieties, and (2) polystyrene and the compatibility enhancing groups being used in an effective amount to provide limited compatibility and limited adhesion between the skin layer and the foam layer at the interface, thereof, to enhance the toughness of the label, the amount of alkylene moieties being an effective amount to provide the skin layer with a shrinkage rate that matches the shrinkage rate of the foam layer when external heat is applied to the skin layer of the label to prevent undesirable wrinkles in the outer surface of the skin layer, the amount of alkylene moieties also being effective to provide a shrinkage force of the skin layer when its outer surface is heated that is not sufficient to form wrinkles on the underside of the foam.

23. A sheet as defined in claim 22 in which the blend comprises polystyrene and about 5 to 50 wt. % of polyethylene ethylacrylate that has compatibility enhancing groups and alkylene moieties.

24. A sheet as defined in claim 22 comprising polystyrene and about 5 to 50 wt. % polyethylene vinyl acetate that contains compatibility enhancing groups and alkylene moieties.

25. A container and a sheet sleeve label therefor, the sheet label comprising a foam polystyrene layer for use on the inside of the sleeve next to the container and an outer skin layer formed by extruding a blend of a polyolefin, polystyrene and a compatibility agent, the compatibility agent being used in an effective amount to provide limited compatibility and limited adhesion between the skin layer and the foam layer at the interface, thereof, to enhance the toughness of the label, the amount of polyolefin being an effective amount to provide the skin layer with a shrinkage rate that matches the shrinkage rate of the foam layer when external heat is applied to skin layer of the label to prevent undesirable wrinkles in the outer surface of the skin layer, the amount of polyolefin also being effective to provide a shrinkage force of the skin layer when its outer surface is heated that is not sufficient to form wrinkles on the underside of the foam.

26. A container and sleeve label as defined in claim 25 in which the container is a glass container.

27. A container and sleeve label as defined in claim 26 in which the label has ends that are overlapped to form a side seam, the side seam being solvent sealed by methylene chloride.

28. A container and sheet sleeve label as defined in claim 22, the sleeve being sealable by solvent sealing, ultrasonic sealing, hot air and heat sealing, the sleeve label comprising a foam polystyrene layer for use on the inside of the sleeve next to the container and an outer skin layer formed by extruding a blend of (1) a polymer having alkylene moieties with 2 to 4 atoms and compatibility enhancing groups for the alkylene moieties, and (2) polystyrene and the compatibility enhancing groups being used in an effective amount to provide limited compatibility and limited adhesion between the skin layer and the foam layer at the interface, thereof, to enhance the toughness of the label, the amount of alkylene moieties being an effective amount to provide the skin layer with a shrinkage rate that matches the shrinkage rate of the foam layer when external heat is applied to skin layer of the label to prevent undesirable wrinkles in the outer surface of the skin layer, the amount of alkylene moieties also being effective to provide a shrinkage force of the skin layer when its outer surface is heated that is not sufficient to form wrinkles on the underside of the foam.

* * * * *